H. A. ROE.
Cheese Vat.
No. 37,524.
Patented Jan. 27, 1863.
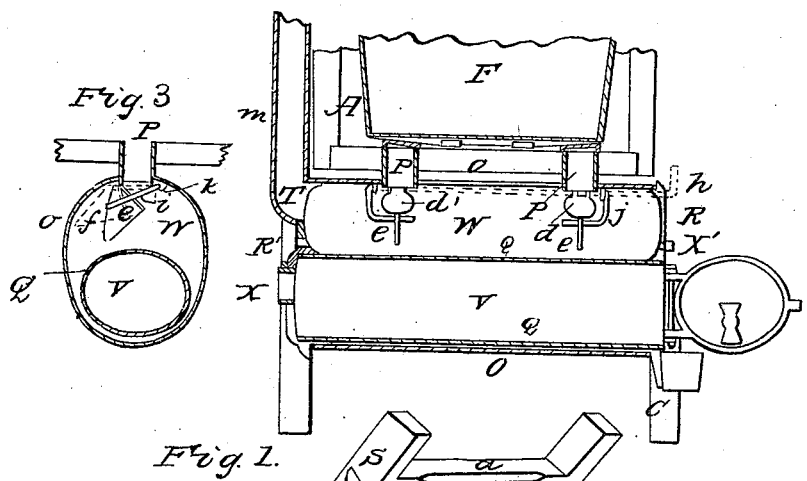
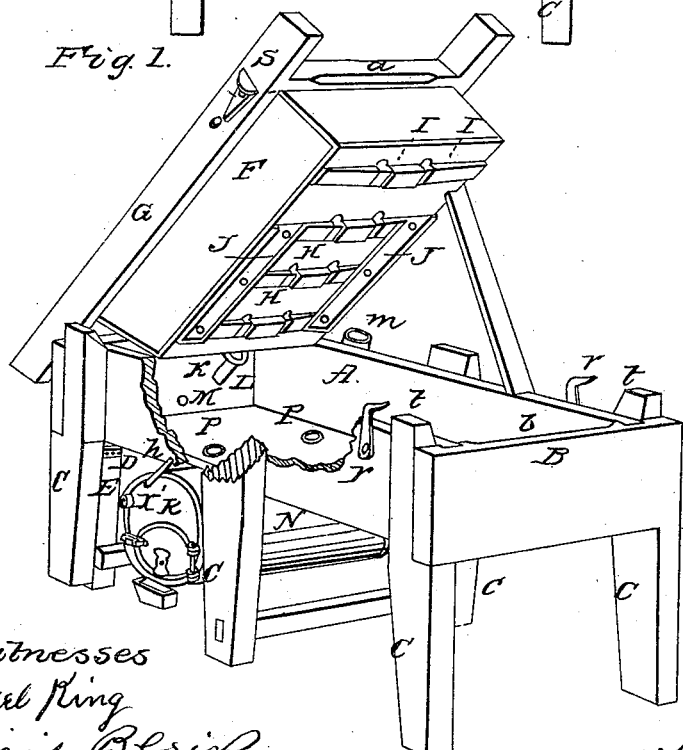

UNITED STATES PATENT OFFICE.

HENRY A. ROE, OF MADISON, OHIO.

IMPROVEMENT IN CHEESE-VATS.

Specification forming part of Letters Patent No. 37,524, dated January 27, 1863.

*To all whom it may concern:*

Be it known that I, HENRY A. ROE, of Madison, in the county of Lake and State of Ohio, have invented certain new and useful Improvements in Cheese-Vats and Heaters therefor; and I do hereby declare that the following is a full and exact description thereof, reference being had to the accompanying drawings, forming a part of this specification, in which—

Figure 1 is a perspective view of my improved vat and heater, a portion of one side being removed; Fig. 2, a vertical section through the interior of the heater; Fig. 3, an end view of said heater, with one end removed, showing its interior arrangement. Like letters refer to like parts.

The value of my improvements relates to regulating and distributing the heat through the milk during the process of cheese-making, and the supply of hot water for other purposes connected therewith, and the simplicity, and consequently diminished cost, and increased durability of the parts and arrangements by which this is accomplished; and it consists, first, in the use of valves within the heater, to close the pipes leading from the heater to the water-vat, by which I am enabled to give large openings and a free circulation of heated water, and close said openings at the proper time, and control the circulation in the most direct and effectual manner; second, in applying valves to each pipe and on opposite sides of the vat, by which all parts of the vat are more directly affected when the valves are opened or closed; also, in so arranging the valves as that they will open by their own gravity, and when closed the heated water and steam will operate in a measure to keep them tight; also, in providing the water-chamber of the heater with a direct and open communication with the air for the free escape of steam when the valves are closed, and also in covering the pipes, where they enter the water-vat, with what I call "inverted distributing-troughs," so formed and shaped as that a part of the heated water shall, by the force of the current itself creates, be discharged under the middle of the milk-vat, and the balance flow outward toward the ends of the vat.

F, Fig. 1, is a milk-vat; G, the frame to which it is rigidly fastened. A is a water-vat that surrounds and incloses the milk-vat when the frame G is lowered and rests on the edge of the water-vat. K is the whey-tube or outlet of the milk-vat, and passes through the wood vat at M. L is a flange by which it is packed and made water-tight. C C C and E are suitable legs for the support of the whole apparatus, all arranged and combined substantially as described, and for the purposes set forth in Letters Patent granted me bearing date June 22, 1858, and numbered 20,663; but my present improvement may be attached and applied to other combination and arrangements of the before-described parts.

I will now proceed to more particularly describe my present improvements.

N, Fig. 1, is the water-heater for supplying hot water to the water-vat and for other purposes. It is an irregular oval cylinder, having its greatest width near the top. It may be a little longer than the water-vat is wide, and of any desired capacity. The heads R R', Fig. 2, are of cast-iron. The head R is provided with a door, ash-pan, and register, and R' with a cap and rim to receive a smoke-pipe. The shell O O may be of cast or sheet iron. P P are tubes or pipes cast or riveted onto the shell, and by which it is connected with the water-vat. V is the flue and fire-chamber. It is one-half inch or more above the bottom of the shell O, so that the water passes clear round it and surrounds the fire. This flue passes through and is made tight in the heads R R', and is closed, one end by the cap and smoke pipe and the other by the door. Around and above this flue is the water-chamber W of the heater, which communicates with the water-chamber of the vat through pipes P P. d d' are valves to close these pipes and cut off communication between the heater and vat. They are loosely hinged to either the pipes or shell of the heater, and swing at right angles with it. To their backs are secured the triangular plates e e, Figs. 2 and 3, by which the valves are closed, by means of the handle h, rod g, and elbows i and j. The rod g passes through a stuffing-box in the head R and turns in its bearings k, Fig. 3. To close the valves press down on the handle h, when the elbow slides down along the edges f of the plates e e, Fig. 3, and the valves are closed simultaneously. Now, elevate the handle $h$, and the valves are released and fall open by their own weight.

$m$, Figs. 1 and 2, is a large pipe that extends from the back end and top of the heater upward outside of and to the top of the water-vat, and connects the water-chamber of the heater with the open air for the free escape of steam when the valves $d\ d'$ are closed.

The gate $X'$ supplies hot water from the heater when wanted for cleansing strainers, pails, &c.

H H H H are slats of a peculiar construction to support the bottom of the tin or milk vat F, and allow of an unobstructed circulation of the heated water under it. They are secured to the vat by the loops I I, soldered to the vat, between the loops, amounting to about one-fourth of the entire length. The slat is of the proper thickness to rest on the bottom of the water-vat and support the milk-vat and contents, giving a space between the two of about one inch. From the loops outward the slats taper to a thin end, to give a clear circulation of the currents of heated water under the milk-vat. To prevent a too great accumulation of heat in the middle and too little at the ends of the vat, I fasten to the thin end of the slats, and immediately over the pipes $d\ d'$, Fig. 2, the inverted distributing-troughs J J. These distributers are narrow strips of sheet metal, three or four inches wide and of any desired length, (longer for a large vat than a small one,) the out edge turned down more and the inside edge less, so that a part only of the currents of heated water, as they pass up out of the heater, shall flow out under the edges of the troughs and the rest flow toward the ends. If the heater is nearer to one end of the vat than to the other, that end of the troughs should be turned down to cause a larger part of the currents to flow to the opposite end, as clearly shown in the drawings, Fig. 1.

Having clearly described the construction of my improved cheese-vat and heater, I will now describe its operation.

The milk-vat (which has been standing open through the day to dry and air it) is lowered to its place, the frame resting on the wood vat and secured to it by hinges or other suitable device at one end, and the other by the hooks $r$, Fig. 1. The rub-iron $s$, on either side of the frame, presses against the legs at $t$, and closes the gasket of packing on the whey-tube K tight against the water-vat at M, and it is ready for use. The milk is now strained into the milk-vat and water turned in at the open end at $a\ b$. This opening is formed by making the frame two or more inches shorter than the water-vat and still further enlarged by beveling the edges, as shown. The water fills the water-chamber of both heater and vat, and if but one cheese is made in twenty-four hours the whole is left to stand until morning, the water serving to cool and preserve the milk. When the morning's milk has been strained into the vat, fire is started in the fire-chamber V and the temperature of the milk raised to 85°, when the valves $d\ d$ are closed and rennet added to the milk. The valves being closed, the water will boil in the heater and the steam escape through the pipe $m$ as freely as from an open kettle. Hot water may now be drawn from the heater through the gate $X'$ for cleansing pails, &c., and the heater refilled from the vat, which will have a surplus. After the curd has been broken and properly prepared for scalding, open the valves and the heated water will boil up through the tubes, some of it escaping from under the distributers and the balance flowing outward to the ends of the vat and heating all parts uniformly. When the temperature has risen to 100° or 104°, again close the valves. The curd is now wheyed off, broken up fine, salted, and ready for the press, and the water drawn from the heater as fast as it becomes boiling hot, to complete the cleaning and scalding of pails, strainers, vat-hoops, &c., pertaining to the dairy-room. When this has been done, the vat is again opened, to air and dry through the day.

Invaluable as simplicity of construction and arrangement is in all classes of machines and implements, in no other is it so much as in that class that relates to agriculture and goes into the hands of farmers, who as a rule are poor mechanics.

Having thus explained the nature, construction, and use of my said improvement, what I claim therein as new, and desire to secure by Letters Patent, is—

1. The combination, with the heater and vat, of a valve or valves, arranged within the heater, and so as to close against the water in the vat or pipe or pipes leading from the heater thereto, substantially as specified.

2. The employment of two or more valves in connection with the heater and vat, arranged to control the supply to the vat on opposite sides of it, essentially as set forth.

3. So arranging the valves which control the supply of hot water to the vat as that they shall close simultaneously, and when closed any pressure in the heater will act to prevent rather than force the circulation, and when released by handle $h$, rod $g$, and elbows $i\ j$, the valves will open by their own gravity, substantially as specified.

4. The combination, with the milk-vat F and slats H H H, of inverted distributing-troughs J J, substantially as and for the purposes specified.

HENRY A. ROE.

Witnesses:
ALBERT KING,
ORRIS BLAIR.